United States Patent [19]
Viret et al.

[11] 3,715,645
[45] Feb. 6, 1973

[54] HIGH PRECISION READING DEVICE OF THE GRADUATIONS OF A PRECISION RULER

[75] Inventors: Robert Viret; Jacques Pettavel, both of Geneva, Switzerland

[73] Assignee: Societe Genevoise D'Instruments de Physique, Geneva, Switzerland

[22] Filed: Aug. 2, 1971

[21] Appl. No.: 168,210

[30] Foreign Application Priority Data

Sept. 2, 1970   Switzerland..................13079/70

[52] U.S. Cl.............................318/603, 318/640
[51] Int. Cl.........................................G05b 19/28
[58] Field of Search............318/640, 593, 577, 603

[56] References Cited

UNITED STATES PATENTS

| | | | |
|---|---|---|---|
| 3,484,666 | 12/1969 | Easton | 318/640 |
| 3,566,239 | 2/1971 | Taniguchi | 318/640 X |
| 3,581,181 | 5/1971 | Wallace | 318/640 |
| 3,622,856 | 11/1971 | Willis | 318/640 |

Primary Examiner—Benjamin Dobeck
Attorney—Irvin S. Thompson and Robert J. Patch

[57] ABSTRACT

The invention concerns a measuring machine comprising a supporting stand carrying a mobile member which can be moved relative to this supporting stand in at least one direction, and a motor fitted with its servo-control device, for driving this mobile member in its movements. The servo-control device is operated alternately by a numerical control device comprising a reversible counter and by an analog control device through the intermediary of a switching device. The analog control device comprises a precision scale carried by the mobile member, a photo-electric microscope furnished with an optical sighting device possessing a rotating field diaphragm, movable between positions corresponding to portions of the measuring field centered on two different marks of the graduation of the precision scale. An impulse generator is angularly rigidly connected to the field diaphragm and delivers control signals for the reversible counter causing the algebraic subtraction from the value recorded in the counter of a number of units equal to the linear movement of the mobile member corresponding to the angular displacement of the rotating diaphragm.

4 Claims, 3 Drawing Figures

HIGH PRECISION READING DEVICE OF THE GRADUATIONS OF A PRECISION RULER

The present invention has as object a high precision measuring machine with numerical reading and control.

Currently existing numerical control measuring machines possess the disadvantage of using means for measuring displacements which are less accurate than standard measuring scales divided for example into millimeters. On the other hand, measuring machines fitted with this latter type of scale are provided with analog reading devices.

The aim of the present invention is to produce a measuring machine with numerical reading and control, the accuracy of which shall be equal to that obtained by measuring machines in which the positioning is measured analogically.

This measuring machine comprises a supporting stand carrying a mobile member which can be moved relative to this supporting stand in at least one direction, and a motor fitted with its servo-control device, for driving this mobile member in its movements. This machine is characterized by the fact that this servo-control device is operated alternately by a numerical control device comprising a reversible counter and by an analog control device through the intermediary of a switching device; by the fact that the analog control device comprises a precision scale carried by the mobile member, a photo-electric microscope furnished with an optical sighting device possessing a rotating field diaphragm, movable between positions corresponding to portions of the measuring field centered on two different marks of the graduation of the precision scale; by the fact that an impulse generator is angularly rigidly connected to the field diaphragm and delivers control signals for the reversible counter causing the algebraic subtraction from the value recorded in the counter of a number of units equal to the linear movement of the mobile member corresponding to the angular displacement of the rotating diaphragm and by the fact that a coupling operated by the reversible counter enables the motor and therefore the mobile member to be coupled to the rotating field diaphragm; the whole being constructed in such a way that the motor is rigidly coupled to this field diaphragm when the reversible counter possesses a state different from the zero state but is uncoupled from it when the counter possesses this zero state and that simultaneously the commutation device connects the servo-control device to the numerical control device when the reversible counter possesses a state different from zero and connects this servo-control device to the analog control device when the counter is at the zero state.

The attached drawing illustrates schematically and by way of example one form of embodiment of the measuring machine according to the invention.

Figure 1:
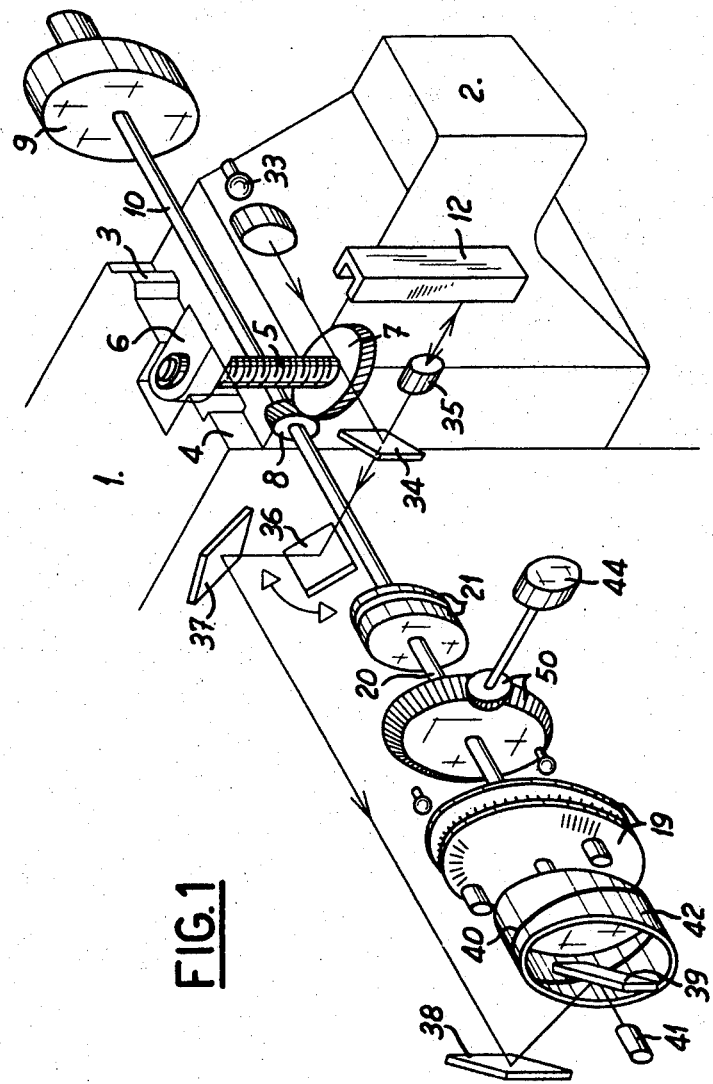
FIG. 1 is a schematic view in principle illustrating a portion of the measuring machine and the mechanical and optical elements of the servo-controls of the mobile member, excluding the electrical elements of these servo-controls.
Figure 2:
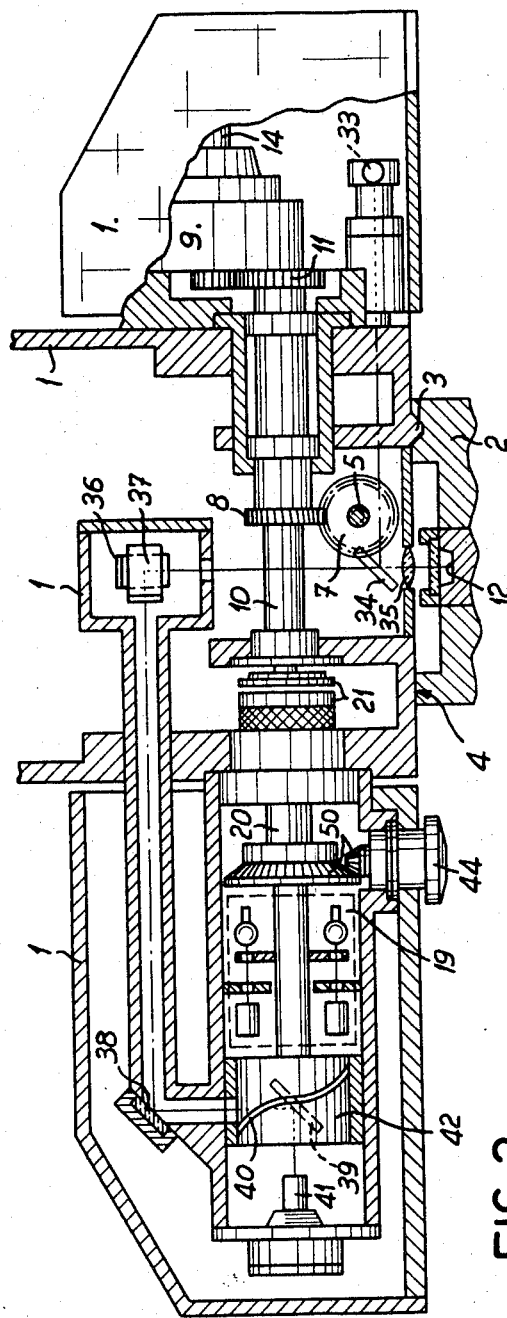
FIG. 2 is a section on a horizontal plane of the machine, indicating the manner in which the elements illustrated in FIG. 1 are incorporated in the measuring machine.
Figure 3:
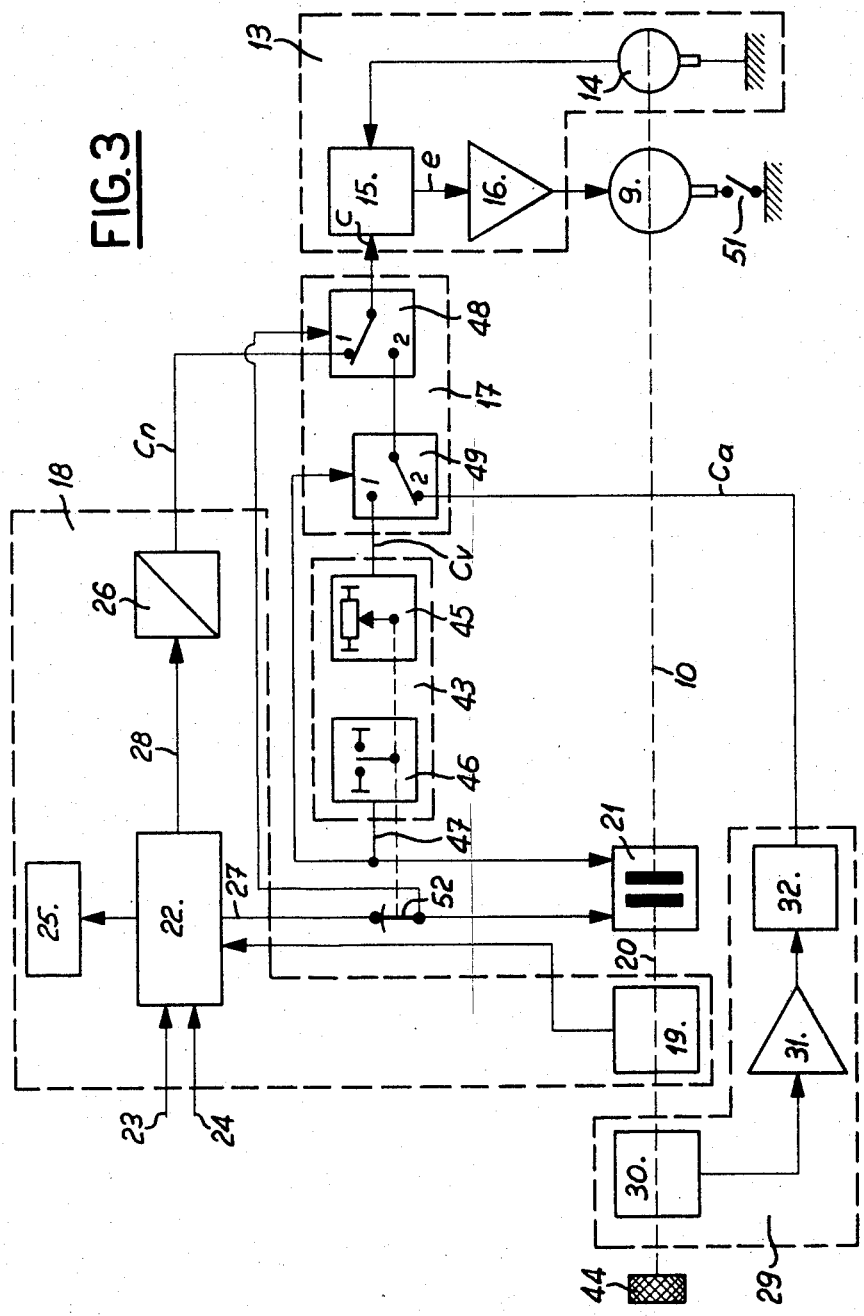
FIG. 3 is a block diagram, illustrating more particularly the electrical part of the measuring machine.

In order to simplify the description, only the control and operating elements of the vertically movable mobile member will be described, it being understood that the measuring machine comprises also two other mobile members which are movable perpendicularly to each other and with respect to the vertical co-ordinate the control systems of which may be identical with that which will be described with reference to the Z coordinate.

This measuring machine comprises a supporting stand 1 and a sliding poppet 2 vertically movable with respect to the supporting stand 1 and guided on the latter by slides 3, 4, one of which is plane and the other V-shaped.

This poppet 2 which constitutes the mobile member for the Z coordinate of the machine described is mechanically connected, for the purpose of imparting to it its vertical movements with respect to the supporting stand 1, by driving screw 5, engaging with a nut 6 attached to this poppet 2. This driving screw 5 is rotatably mounted in the supporting stand 1 and cannot move longitudinally relative thereto, and is rigidly attached to a helically toothed wheel 7, engaging with a driving pinion 8, driven by a motor 9 of the driving apparatus for the poppet 2, through a driving shaft 10 rotatably mounted in the supporting stand 1. The reduction ratio introduced by the wheel 7 and its pinion 8 causes a displacement of the mobile member 2 equal to the interval between two graduations of a precision scale 12 rigidly fixed on this mobile member 2, to correspond to one rotation of the shaft 10.

A servo-control device 13 of conventional type is provided, comprising a tachometric generator 14, a comparator 15 and a control amplifier 16 (this device could be a "Rotran System" manufactured by Inland Motor Corp., Division of Kollmorgen, Radford, Va. or another type of rate servo). A complete description is given in the "Direct Drive Servo Design Handbook" edited by Inland Corp. Another servo of this type is described in "Control Engineering" of Feb. 1971 by L. J. Spalla, pages 56–58. The comparator 15 emits an error signal e corresponding to the difference between the signal supplied by the tachometric generator 13 corresponding to the actual speed of the motor 9 and an instruction signal C emitted by a commutating device 17 as will be seen below.

The numerical control device 18 for controlling the displacements of the mobile member 2, comprises an optical impulse generator 19, the movable disc of which is rigidly attached to a shaft 20 aligned with the driving shaft 10 and capable of being connected to the latter, for the purpose of combined rotation by an engaging gear, in this case an electro-magnetic coupling 21. This optical generator 19 supplies a train of impulses which, when it is driven by the motor 9 through the electromagnetic coupling 21, corresponds to the displacements of the mobile member 2. This train of impulses is supplied to a reversible counter 22. The optical generator may be of the "CODIROT" type, manufactured by Contraves S.A., while the reversible counter 22 may be of the type described in U.S. Pat. No. 3,590,260 permitting descrimination of the rotational sense of the shaft 20.

The reversible counter 22 comprises a zeroing device 23 and an input 24 permitting the counter to be set to a desired value.

Finally, this numerical control device comprises in addition a display 25 indicating the state of the counter 22 and a digital-analog convertor 26 supplied from the output of the counter 22 and providing a numerical control signal $Cn$, supplied to the commutation device 17. This display may be of the type described in U.S. Pat. No. 3,590,260, while the digital-analog convertor may be of the type described in the article by Alan Arthur titled "Digital analogue conversion," published in the review "Electrotechnology" for Nov. 1964. Converter 26 is available commercially as model DAC20 of Brown Burr Research Corp., International Airport Industrial Park, Tucson, Ariz. 85706.

The reversible counter 22 comprises another output 27 which, when the counter is in the zero state, supplies a control signal on the one hand to the electromagnet coupling 21 and on the other hand to the commutation device 17.

The measuring machine also comprises an analog control device 29 which comprises a photoelectric microscope 30 and electronic circuits 31, 32 for shaping and treating the electrical signals emitted by the photoelectric microscope 30, and which emits an error signal $Ca$ supplied to the commutation device.

This photoelectric microscope is of the type described in U.S. Pat. No. 3,590,260 and comprises an optical sighting device comprising a luminous source 33 formed by an incandescent lamp, a semi-transparent mirror 34 reflecting the incident rays from the source 33 through an object glass 35 onto the precision scale 12. The rays reflected by this precision scale 12 pass through the object glass 35, the semi-transparent mirror, are subjected to the action of a vibrating mirror 36 to produce a sweeping action of the image of the mark of the graduated scale 12 sighted and then directed by mirrors 37, 38 onto a mirror 39 situated inside a rotating field diaphragm 42, to arrive at the photoelectric cell 41 supplying the electronic part 31, 32 of the photoelectric microscope by passing through the transparent helical slot 41 of the field diaphragm at the surface of which diaphragm is formed the image of the marks of the precision scale 12.

The rotating field diaphragm 42 is cylindrical and possesses an opaque wall furnished with a helical slot having at least one turn, the pitch of which, allowing for the optical magnification of the sighting device, corresponds to the interval separating two successive marks of the graduation of the precision scale 12. This field diaphragm 42 is rigidly mounted on the shaft 20 driving the rotating disc of the optical generator 19.

Finally, the measuring machine described comprises also two manual controls, the one known as speed control 43, and the other as fine control 44.

The speed control 43 emits a control signal $Cv$ to the commutation device, having an amplitude which is variable, for example by means of a potentiometer 45. The cursor of this potentiometer controls an interrupter 46 which, when it is engaged, that is to say when the speed control is functioning, emits a control signal 47 to the electromagnetic coupling 21 and to the commutation device 17. The fine control comprises a control knob 44 which causes the shaft 20 to rotate through the intermediary of a pair of conical gears 50 or friction wheels.

The commutation device 17 comprises two commutators 48, 49, one of which 48 is controlled through the intermediary of a relay (not shown) by the control signal 27 emitted by the counter 22, and the other of which 49 is controlled through the intermediary of a relay (not shown) by the control signal 47 from the speed control 43. As will be seen, this commutation device 17 permits the delivery as an instruction signal $C$ to the comparator 15, of the control signal $Cn$, the control signal $Ca$ or the control signal $Cv$, depending upon the functioning of the measuring machine.

The measuring machine described can function in two different ways; either by effecting an automatic positioning of the movable member in a position corresponding to the nominal coordinate of a piece to be measured and then measuring the difference between this nominal position and the actual position of the piece, or by sensing under manual control from a specified origin the piece to be measured in order to obtain the actual measurements of this piece.

The first method of operation, known as automatic operation, of this measuring machine is as follows:

Using the control 24, the operator sets the counter 22 to the desired value, that is to the coordinate corresponding to the desired displacement of the movable member 2. As soon as the counter 22 is no longer in its zero state, a control signal appears at its output 27, causing the engagement of the electromagnetic coupling 22 and therefore the rigid connection of the shaft 20 to the shaft 10, and the setting of the commutator 48 into the position 1 (illustrated). Since the speed control 43 is in the zero position, the commutator 49 is in position 2.

The operator then closes the supply contact 51 to the motor 9, thus setting it in motion. This motor 9 causes the shafts 10 and 20 to rotate and thus produces the linear displacement of the movable member 2 in the desired direction, depending upon the rotational sense of the motor 9, and also produces the rotational movement of the optical generator 19. For each complete revolution of the shaft 20, the optical generator emits a succession of impulses leading to the subtraction of a number of units equal to the distance covered by the movable member 2 from the coordinate introduced into the counter 22. This of course leads to a reduction in the amplitude of the numerical control signal $Cn$ which is supplied to the comparator 15 of the servo-control device 13 of the motor 9 by the commutator 48 of the commutation device 17.

The member is thus moved into position by the numerical control device until the counter 22 is at its zero state, that is until the movable member has been displaced theoretically by a value equal to the coordinate introduced initially into the counter 22.

It is quite clear that in variants of embodiment, speed reduction thresholds could be provided for slowing down the displacement speed of the movable member when it arrives in the immediate vicinity of the desired position, so as to prevent any over-run of the latter as a consequence of the inertia of the movable member.

From the moment when the counter 22 is at the zero state, the output 27 causes the opening of the electromagnetic coupling 21 and thus the separation of the shafts 10 and 20, as well as the movement of the commutator 48 to its position 2, thus connecting the comparator 15 of the servo-control device 13 to the analog control device 29.

From this moment onwards the optical generator 19 and the rotating field diaphragm 4 of the photoelectric microscope 30 are immobile, but the motor receives an instruction signal C emanating from the analog control device 29, such that when the image of the graduation of the precision scale 12 which is sighted by the photoelectric microscope is not absolutely centered with respect to the helical slot (or at least to the portion of the latter which is swept by the reflected rays) the motor will displace the movable member to bring it into its rigorously exact position. In this way inaccuracies of positioning of the movable member 2, resulting from its mechanical drive connection, are eliminated during this analog fine positioning stage. Indeed, the position of the field diaphragm 42 produced by the first numerical positioning phase is rigorously exact, since this field diaphragm is directly connected during this stage to the shaft of the motor 9 itself servo-controlled to the state of the counter 22 by the control signal Cn. The functioning of the photoelectric microscope itself is well known and will not be described here. It is similar to that of the photoelectric microscope described in U.S. Pat. No. 3,590,260.

When it is desired to use the measuring machine under manual control, the operator sets the counter 22 to zero by the zeroing device 23; this causes the opening of the electromagnetic coupling 21 by the control signal 27 and the switching of the commutator 48 to position 2, actuates the cursor of the potentiometer device 45, thus interrupting the connection of the control signal 27 by an interrupter 52 and causing the closing of the electromagnetic coupling 21 by the control signal 47 and the switching of the commutator 49 to position 1. Thus when the interrupter 51 is closed, the speed of the motor is controlled manually by the speed control 43. Since the shaft 20 has been rigidly locked to the shaft 10, the displacement of the movable member 2 is automatically counted at 22 and displayed at 25, so that the operator may approach the desired coordinate by causing the speed to vary through the speed control 43, the output signal of which is supplied to the comparator 15.

When the movable member is in the vicinity of the desired coordinate, the speed control is reset to zero, thus causing, through the control signal 47, the opening of the electromagnetic coupling 21 and the switching of the commutator 49 to position 2. Henceforth the servo-control device 13 again receives its instruction signal C through the analog control device 29. The operator can now finely adjust the position of the movable member by actuating the knob 44, rotationally driving firstly the field diaphragm 42 and thus, through the intermediary of the photoelectric microscope 30, the movable member, and secondly the optical generator 19, thus initiating the counting and display of the fine displacement of the movable member.

In one variant, the knob 44 may be connected to the shaft 20 by a connection which permits it to be disconnected when it is not utilized for operating the measuring machine.

We claim:
1. A measuring machine comprising a supporting stand carrying a movable member which can be displaced with respect to the supporting stand in at least one direction, a motor having a servo-control device for imparting to said movable member its movements, means alternately controlling said servo-control device, said alternate control means comprising a numerical control device comprising a reversible counter and an analog control device that acts on said servo-control device through a commutation device, said analog control device comprising a precision scale carried by the movable member, said precision scale having graduation marks thereon, a photoelectric microscope having an optical sighting device having a rotating field diaphragm movable between positions corresponding to portions of the measuring field centered on two different graduation marks of the precision scale, an impulse generator rotatable with the field diaphragm and supplying control signals to the reversible counter producing the algebraic subtraction from the value recorded in said counter of a number of units equal to the linear displacement of the movable member corresponding to the angular displacement of the rotating diaphragm, a coupling controlled by the reversible counter for coupling the motor and movable member to the rotating field diaphragm, means rigidly coupling the motor to the field diaphragm when the reversible counter is at zero and uncoupling the motor from the field diaphragm when the counter is at other than zero, and means connecting the servo-control device to the numerical control device through the commutation device when the reversible counter is at zero and connecting said servo-control device to the analog control device when the counter is at other than zero.

2. A machine as claimed in claim 1, and a manual control comprising a speed control and a fine regulation knob.

3. A machine as claimed in claim 2, said speed control being a potentiometer, means when the potentiometer is at other than zero to connect the servo-control device to the output of the speed control, and means engaging the coupling mechanically connecting the motor to the field diaphragm in all conditions of the counter.

4. A machine as claimed in claim 3, said fine regulation knob being mechanically connected to the field diaphragm to drive the field diaphragm in slow rotation when the field diaphragm is uncoupled from the motor.

* * * * *